(12) United States Patent
Youn et al.

(10) Patent No.: US 11,280,767 B2
(45) Date of Patent: Mar. 22, 2022

(54) PRETREATMENT METHOD FOR ANALYZING DIOXIN COMPOUNDS AND ANALYTICAL METHOD USING THE SAME

(71) Applicant: LG Chem, Ltd., Seoul (KR)

(72) Inventors: Yeu Young Youn, Daejeon (KR); Byoung Hyoun Kim, Daejeon (KR); Young Hee Lim, Daejeon (KR); Hye Sung Cho, Daejeon (KR); Su Youn Han, Daejeon (KR); Mi Ra Hong, Daejeon (KR); Yeon Hwa Lee, Daejeon (KR)

(73) Assignee: LG Chem, Ltd.

( * ) Notice: Subject to any disclaimer, the term of this patent is extended or adjusted under 35 U.S.C. 154(b) by 588 days.

(21) Appl. No.: 16/084,402

(22) PCT Filed: Oct. 20, 2017

(86) PCT No.: PCT/KR2017/011681
§ 371 (c)(1),
(2) Date: Sep. 12, 2018

(87) PCT Pub. No.: WO2018/088716
PCT Pub. Date: May 17, 2018

(65) Prior Publication Data
US 2019/0079060 A1      Mar. 14, 2019

(30) Foreign Application Priority Data
Nov. 11, 2016   (KR) .................. 10-2016-0150513

(51) Int. Cl.
*G01N 30/00*     (2006.01)
*G01N 30/14*     (2006.01)
(Continued)

(52) U.S. Cl.
CPC ............ *G01N 30/14* (2013.01); *B01J 20/261* (2013.01); *B01J 20/285* (2013.01); *G01N 1/405* (2013.01);
(Continued)

(58) Field of Classification Search
CPC ....................................................... G01N 30/14
(Continued)

(56) References Cited

U.S. PATENT DOCUMENTS

2001/0035372 A1   11/2001   Bouvier et al.
2007/0196928 A1    8/2007   Nakanishi et al.
(Continued)

FOREIGN PATENT DOCUMENTS

JP      H09292386 A      11/1997
JP      2000514704 A     11/2000
(Continued)

OTHER PUBLICATIONS

Malagu et al. "Preparation of Soluble Polymeric Supports with a Functional Group for Liquid-Phase Organic Synthesis" Synlett 2002, No. 2, 316-318 (Year: 2002).*

(Continued)

*Primary Examiner* — Christine T Mui
*Assistant Examiner* — Emily R. Berkeley
(74) *Attorney, Agent, or Firm* — Lerner, David, Littenberg, Krumholz & Mentlik, LLP

(57) ABSTRACT

A pretreatment method for analyzing dioxin compounds and an analytical method using the same, in which a column packed with polymer beads that are capable of selectively adsorbing dioxin compounds is used in a purification step during pretreatment, thereby remarkably reducing a time required for pretreatment and improving a recovery rate of an internal standard for purification, are provided.

17 Claims, 6 Drawing Sheets

(51) Int. Cl.
*G01N 30/72* (2006.01)
*B01J 20/285* (2006.01)
*G01N 1/40* (2006.01)
*G01N 30/06* (2006.01)
*G01N 30/66* (2006.01)
*G01N 30/88* (2006.01)
*B01J 20/26* (2006.01)
*B01J 20/281* (2006.01)
*G01N 30/04* (2006.01)

(52) U.S. Cl.
CPC ........... *G01N 30/06* (2013.01); *G01N 30/482* (2013.01); *G01N 30/66* (2013.01); *G01N 30/7206* (2013.01); *G01N 30/88* (2013.01); *G01N 30/72* (2013.01); *G01N 2030/045* (2013.01); *G01N 2030/062* (2013.01); *G01N 2030/143* (2013.01)

(58) Field of Classification Search
USPC ........................................................ 436/178
See application file for complete search history.

(56) References Cited

U.S. PATENT DOCUMENTS

| | | |
|---|---|---|
| 2008/0038838 A1 | 2/2008 | Nakamura et al. |
| 2014/0096596 A1 | 4/2014 | Brousmiche et al. |

FOREIGN PATENT DOCUMENTS

| | | |
|---|---|---|
| JP | 2001272400 A | 10/2001 |
| JP | 2002040007 A | 2/2002 |
| JP | 2002122577 A | 4/2002 |
| JP | 2002228559 A | 8/2002 |
| JP | 2003344378 A | 12/2003 |
| JP | 2004108838 A | 4/2004 |
| JP | 2005214816 A | 8/2005 |
| JP | 2006192420 A | 7/2006 |
| JP | 2007160141 A | 6/2007 |
| JP | 2007225283 A | 9/2007 |
| JP | 2008195793 A | 8/2008 |
| JP | 2011183287 A | 9/2011 |
| JP | 2014513807 A | 6/2014 |
| KR | 20000042038 A | 7/2000 |
| KR | 20050105538 A | 11/2005 |
| KR | 20140143967 A | 12/2014 |
| WO | 2001093989 A2 | 12/2001 |

OTHER PUBLICATIONS

Quintana JB, Boonjob W, Miro M, Cerda' V. Online coupling of bead injection lab-on-valve analysis to gas chromatography: Application to the determination of trace levels of polychlorinated biphenyls in solid waste leachates. Analytical chemistry. May 13, 2009;81(12):4822-30.

Test Method for Dioxins and Furans in Wastewater samples—HRGC/HRMS? in the Official Method of Unintentionally Produced Persistent Organic Pollutants (UPOPs) announced by the Ministry of Environment in 2007, Republic of Korea.

International Search Report for PCT/KR2017/011681 dated Feb. 12, 2018.

* cited by examiner

[FIG. 1]
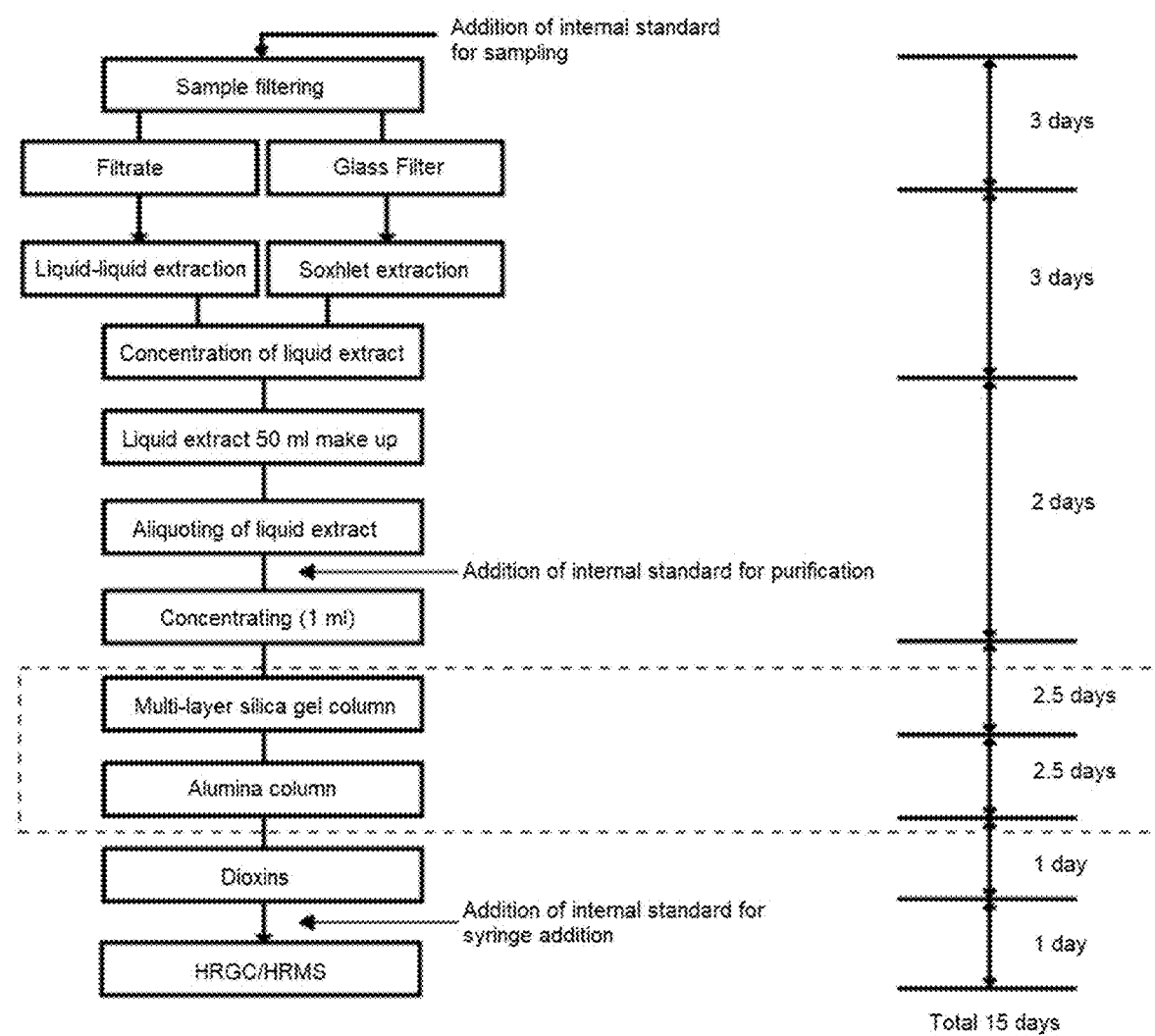

[FIG. 2]
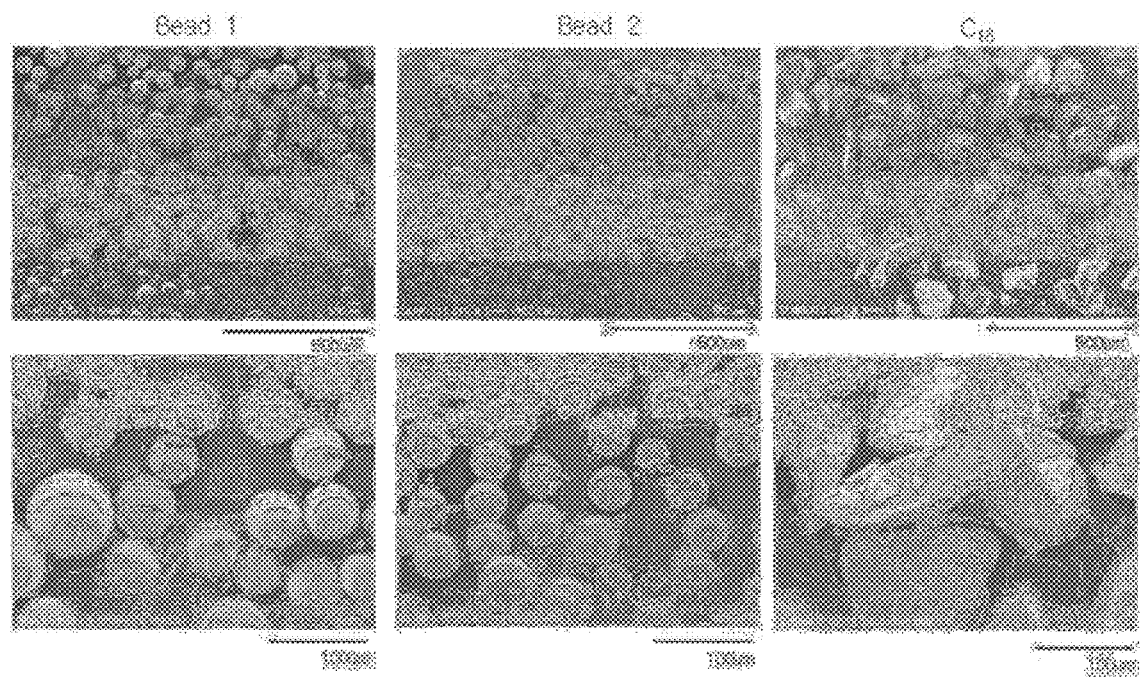
[FIG. 3]
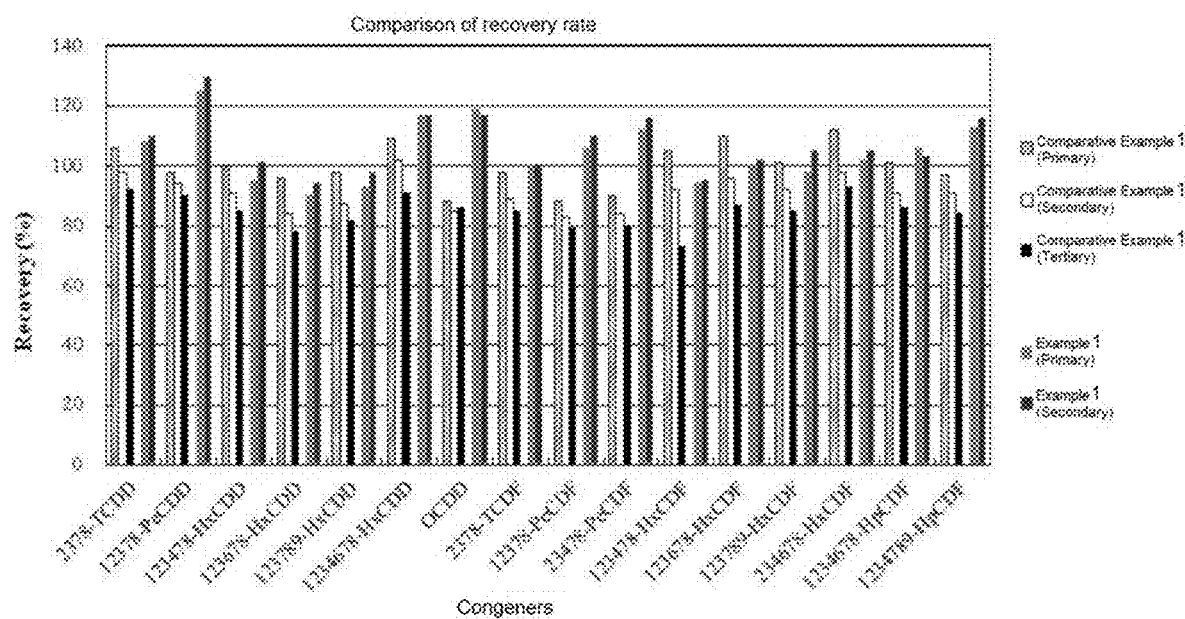

[FIG. 4]
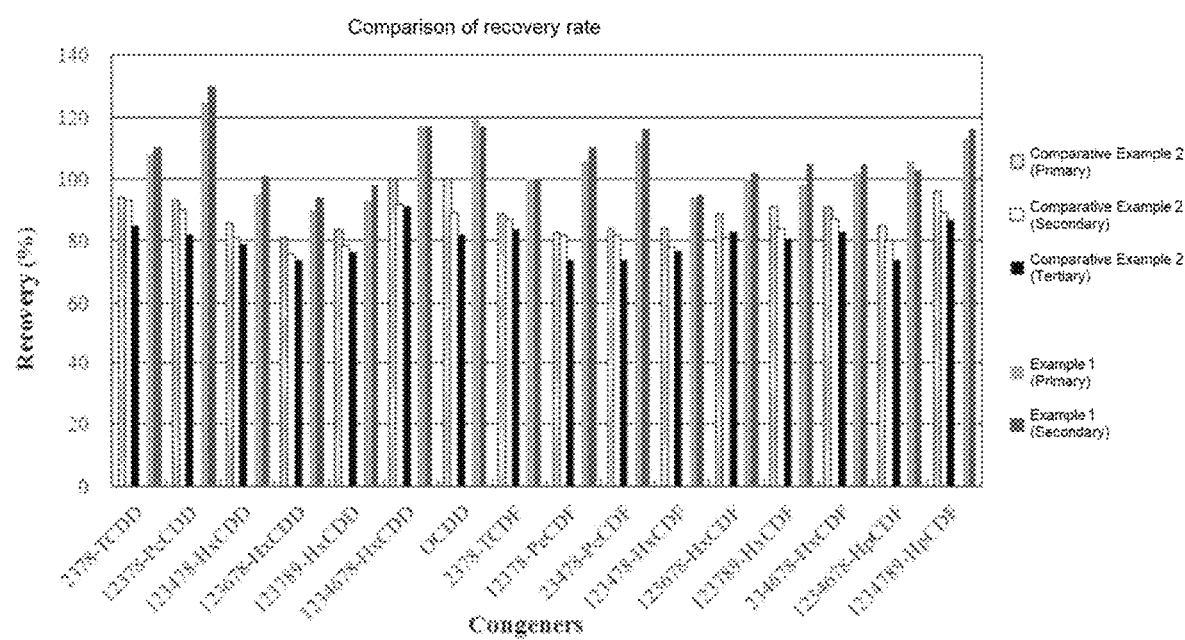

[FIG. 5]
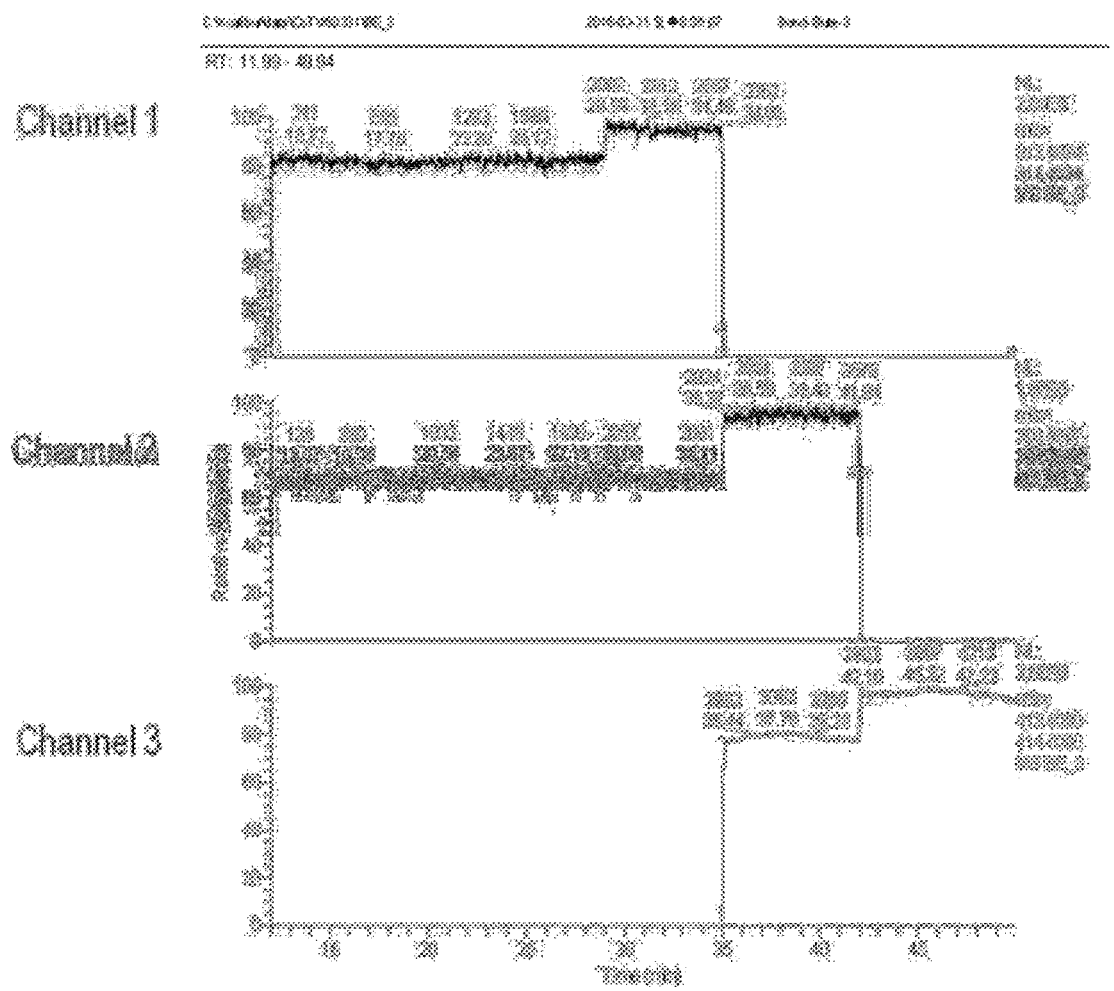

[FIG. 6]
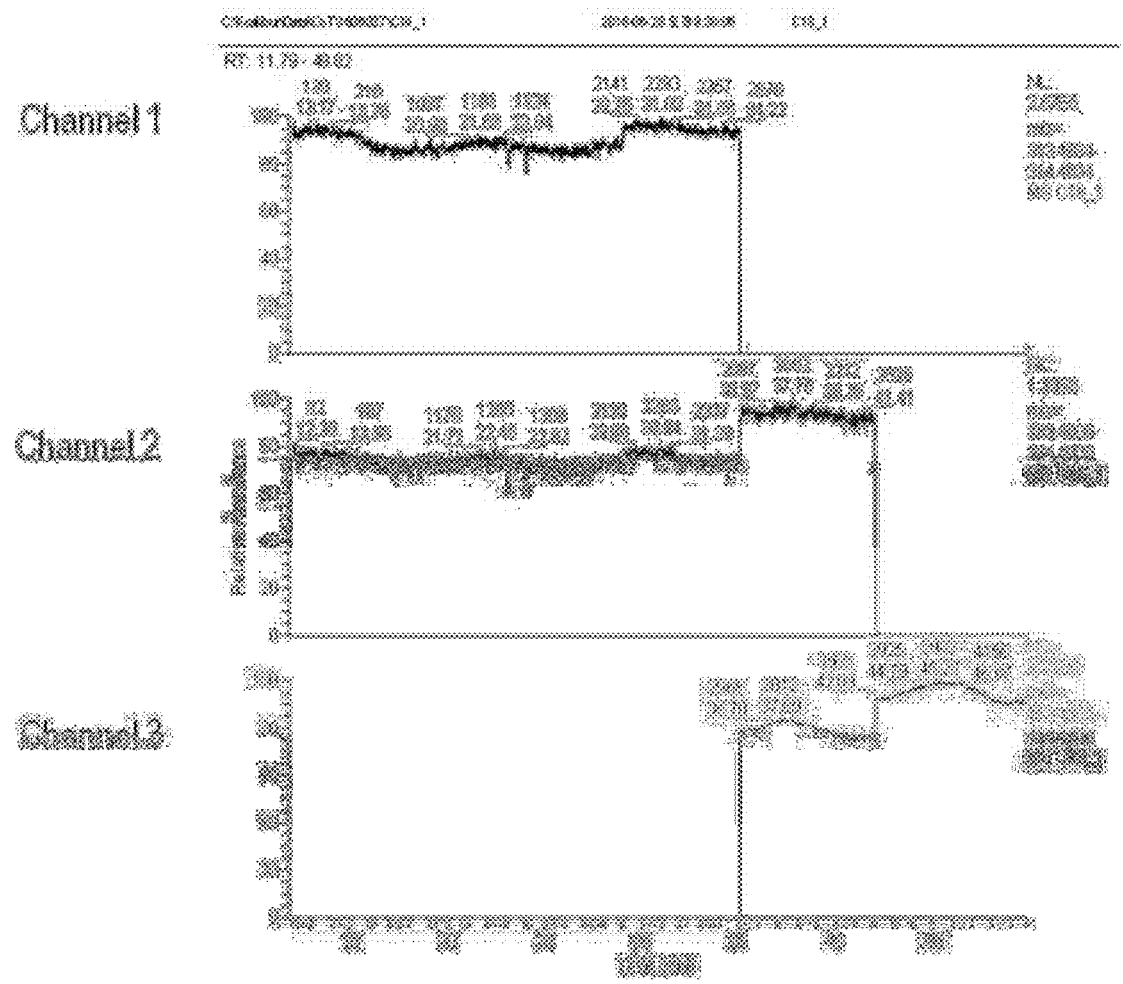

[FIG. 7]
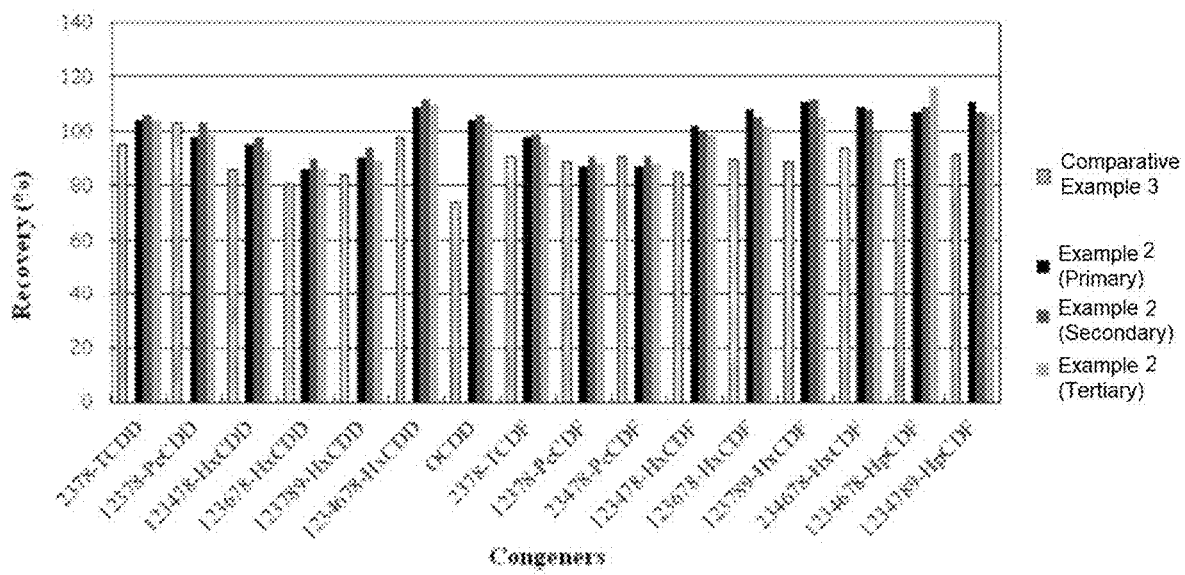
[FIG. 8]

PRETREATMENT METHOD FOR ANALYZING DIOXIN COMPOUNDS AND ANALYTICAL METHOD USING THE SAME

CROSS-REFERENCE TO RELATED APPLICATIONS

The present application is a national phase entry under 35 U.S.C. § 371 of International Application No. PCT/KR2017/011681 filed Oct. 20, 2017, which claims priority from Korean Patent Application No. 10-2016-0150513 filed Nov. 11, 2016, the disclosures of which are incorporated herein by reference.

TECHNICAL FIELD

The present invention relates to a pretreatment method for analyzing dioxin compounds using a column packed with polymer beads capable of selectively adsorbing dioxin compounds, and an analytical method using the same.

BACKGROUND ART

Dioxin compounds are a kind of persistent organic pollutants (POPs) and a general term for polychlorinated dibenzo-p-dioxins (PCDDs) and polychlorinated dibenzofurans (PCDFs). Dioxin compounds have a total of 210 kinds of congeners, specifically, 75 kinds of PCDDS and 135 kinds of PCDFs.

Dioxin compounds are very stable colorless crystalline solids at room temperature, and are resistant to physicochemical or biological degradation. Particularly, among the 210 kinds of congeners, 17 kinds of congeners (7 kinds of PCDDs and 10 kinds of PCDFs) substituted with chlorine atoms at positions 2, 3, 7, and 8 are subject to regulation. Therefore, the Ministry of Environment regulates their toxic equivalent quality (TEQ) to 50 pg I-TEQ/L.

Accordingly, there is a demand for a test method of analyzing dioxins present in exhaust gas, river water, wastewater, soils/sediments, solid/liquid wastes, etc. However, dioxin compounds are present in water at a very low level of ppq (part-per-quadrillion) ranging from $10^{-4}$ to $10^{-8}$ ng/L. Therefore, in order to detect dioxin compounds, it is necessary to quantify trace amounts thereof. For this reason, a high level of technology for extracting and purifying only dioxins which are target materials in samples is required.

Generally, analysis of dioxin compounds requires a pretreatment step including a step of extracting dioxin compounds from a sample; a purification step of removing interfering substances from a liquid extract; and a step of concentrating an eluate. Therefore, it is necessary to provide an indicator that indicates whether the pretreatment step has proceeded properly. The indicator is used to measure recovery rates of standards for sampling and standards for purification, thereby determining accuracy of the analysis of dioxin compounds. For example, according to 「Test Method for Dioxins and Furans in Wastewater samples—HRGC/HRMS」 in the Official Method of Unintentionally Produced Persistent Organic Pollutants (UPOPs) announced by the Ministry of Environment in 2007, measured recovery rates must be presented with sample analysis results, and when recovery rates of 15 congeners are in the range of 50% to 120%, the analysis is determined to be valid. If the recovery rates are out of the range, retesting is required. The retesting leads to a considerable increase in the analysis time, and therefore it is necessary to develop a method of detecting dioxins in terms of analysis accuracy of dioxin compounds as well as prevention of delay of analysis due to the retesting.

Accordingly, the present inventors conducted intensive studies on a pretreatment method for analyzing dioxin compounds, and as a result, they confirmed a method of purifying dioxin compounds using a column packed with polymer beads capable of selectively adsorbing dioxin compounds, as described below, thereby completing the present invention.

PRIOR ART DOCUMENTS

Non-Patent Document (Non-Patent Document 0001) Official Method of Persistent Organic Pollutants [Ministry of Environment Notice No. 2007-165, Nov. 15, 2007, Ministry of Environment Notice No. 2013-117, amended on Sep. 25, 2013, the Republic of Korea

DISCLOSURE

Technical Problem

The present invention provides a pretreatment method for analyzing dioxin compounds using a column packed with polymer beads capable of selectively adsorbing dioxin compounds.

Further, the present invention provides an analytical method for dioxin compounds using the pretreatment method.

Technical Solution

In order to solve the above problems, the present invention provides a pretreatment method for analyzing dioxin compounds, the method including the following steps of:

1) obtaining a liquid extract including dioxin compounds from a sample;

2) adsorbing the dioxin compounds onto polymer beads by passing the liquid extract through a column packed with the polymer beads;

3) removing substances which are not adsorbed onto the polymer beads by passing a first solvent through the column packed with the dioxin compound-adsorbed polymer beads; and 4) obtaining an eluate including dioxin compounds which are eluted in a second solvent by passing the second solvent through the column packed with polymer beads from which the unadsorbed substances have been removed.

As used herein, the term 'dioxin compounds' mean polychlorinated dibenzo-p-dioxins (PCDDs), polychlorinated dibenzofurans (PCDFs), or combinations thereof, and refer to the terms 'dioxin and furan' as described in 「The Official Method of Persistent Organic Pollutants」 announced by the Ministry of Environment in 2007.

「The Official Method of Persistent Organic Pollutants」 announced by the Ministry of Environment in 2007 may served as a reference for a known method of analyzing dioxin compounds in a sample, and a schematic illustration thereof is shown in FIG. 1 for reference. In detail, according to the Official Method of the Ministry of Environment in FIG. 1, a pretreatment method for analyzing dioxin compounds includes extraction and purification steps of a sample. Of them, the purification step includes a 2-step process of passing a concentrated liquid extract through a multi-layer silica gel column and an alumina column, respectively, and this step takes a total of five days. This purification step is performed in order to remove substances other than dioxin compounds, that is, interfering substances, from a liquid extract by using columns packed with two different kinds of fillers.

In contrast, the present invention is characterized in that the pretreatment process for analyzing dioxin compounds in a sample adopts not a method of removing interfering substances other than dioxin compounds from the liquid extract, but a method of purifying dioxin compounds from the liquid extract by selectively adsorbing only dioxin compounds. In other words, the pretreatment method of the present invention is characterized in that the purification step (purification by silica gel and alumina columns) of 「The Official Method of Persistent Organic Pollutants」 announced by the Ministry of Environment in 2007 is replaced by the above purification steps of 2) to 4). When this pretreatment method is used, the time required for the pretreatment may be remarkably shortened, the amount of the solvent required for the purification step may be reduced, and a recovery rate of a standard material for purification may be improved at the same time, as compared with the pretreatment method announced by the Ministry of Environment. Accordingly, retesting due to the recovery rate problem may be reduced to allow rapid analysis.

Hereinafter, each step of the present invention will be described.

Step of Obtaining Liquid Extract Including Dioxin Compounds from Sample (Step 1)

Step 1 is an extraction step of obtaining a liquid extract including dioxin compounds from a sample which is collected from exhaust gas, river water, wastewater, soils/sediments, solid/liquid wastes, etc.

The sample may be a sample, to which an 「internal standard for sampling」 is added, and this internal standard for sampling may be added immediately before collection. Here, the internal standard for sampling refers to an organic compound that is similar to an analyte in chemical structure or chemical properties but is not found in a sample medium, and refers to a material added immediately before sampling in order to determine reliability of the sampling method. For example, $^{37}Cl$-2, 3, 7, 8-TeCDD and $^{37}Cl$-labeled-PCDD may be used. Extraction of the liquid extract may be performed by liquid-liquid extraction, solid phase extraction, Soxhlet extraction, or a combination thereof.

Specifically, the liquid-liquid extraction may be performed by using a liquid-liquid extraction device. The liquid-liquid extraction device is composed of a vertical shaker and a separatory funnel. The vertical shaker may vertically shake several separatory funnels at a time, and may be shaking speed- and time-controllable. When the liquid-liquid extraction is performed, hexane or toluene may be used as an extraction solvent.

Further, the solid phase extraction may be performed by using a solid phase extraction device. The solid phase extraction device may use a filtering device, and has a form in which a collection disc is inserted in the middle. A vacuum pump may be used to control an extraction time, and many different kinds of collection discs may be used.

Further, the Soxhlet extraction may be performed by using a Soxhlet extraction device. The Soxhlet extraction device may be composed of a thimble made of glass, a cooling device, an extraction flask, and a heating device. When the Soxhlet extraction is performed, toluene may be used as an extraction solvent.

Therefore, the liquid extract prepared in Step 1 may be a solution in which dioxin compounds are dissolved in toluene or hexane.

Between the extraction step of Step 1 and Step 2 described below, steps of adding an internal standard for purification to the liquid extract, and concentrating the liquid extract to which the internal standard for purification is added, may be further included.

Here, the 「internal standard for purification」 refers to an organic compound that is similar to an analyte in chemical structure or chemical properties but is not found in a sample medium, and it may be added in order to determine reliability of the analysis method. For example, the internal standard for purification may be one or more selected from the group consisting of $^{13}C_{12}$-2, 3, 7, 8-TeCDD, $^{13}C_{12}$-1, 2, 3, 7, 8-PeCDD, $^{13}C_{12}$-1, 2, 3, 4, 7, 8-HxCDD, $^{13}C_{12}$-1, 2, 3, 6, 7, 8-HxCDD, $^{13}C_{12}$-1, 2, 3, 4, 6, 7, 8-HpCDD, $^{13}C_{12}$-1, 2, 3, 4, 6, 7, 8, 9-OCDD, $^{13}C_{12}$-2, 3, 7, 8-TeCDF, $^{13}C_{12}$-1, 2, 3, 7, 8-PeCDF, $^{13}C_{12}$-2, 3, 4, 7, 8-PeCDF, $^{13}C_{12}$-1, 2, 3, 4, 7, 8-HxCDF, $^{13}C_{12}$-1, 2, 3, 6, 7, 8-HxCDF, $^{13}C_{12}$-1, 2, 3, 7, 8, 9-HxCDF, $^{13}C_{12}$-2, 3, 4, 6, 7, 8-HxCDF, $^{13}C_{12}$-1, 2, 3, 4, 6, 7, 8-HpCDF and $^{13}C_{12}$-1, 2, 3, 4, 7, 8, 9-HpCDF, but is not particularly limited thereto. TeCdd represents tetrachlorodibenzo-p-dioxin, TeCDF represents tetrachlorodibenzofuran, PeCDD represents pentachlorodibezo-p-dioxin, PeCDF represents pentachlorodibenzofuran, HxCDD represents hexachlorodibenzo-p-dioxin, HxCDF represents hexachlorobenzofuran, HpCDD represents heptachlorodibenzo-p-dioxin, HpCDF represents heptachlorodibenzofuran, OCDD represents octachlorodibenzo-p-dioxin, and OCDF represents octachlorobenzofuran.

The concentrating of the liquid extract to which the internal standard for purification is added may be performed by rotary evaporation concentration and nitrogen concentration. Specifically, the rotary evaporation concentration may be performed by evaporating toluene and/or hexane, which is used as a solvent in the liquid extract, using a rotary evaporator, and the nitrogen concentration may be performed by additionally evaporating toluene and/or hexane using nitrogen gas. For example, the concentrating of the liquid extract may be performed to about 50 µl to about 500 µl.

Step of Adsorbing Dioxin Compounds Onto Polymer Beads by Passing Liquid Extract Through Column Packed with Polymer Beads (Step 2)

Step 2, one of purification steps for analyzing dioxin compounds, is a step of selectively adsorbing only dioxin compounds onto polymer beads packed in a column.

The polymer beads used in the present invention refer to porous particles including one or more hydrophobic repeating units derived from a vinyl aromatic monomer having a non-polar functional group and one or more hydrophilic repeating units derived from a vinyl aromatic monomer having a polar functional group. Here, the 'vinyl aromatic monomer having a non-polar functional group' refers to an aromatic cyclic compound having a vinyl group without containing a polar functional group described below, and the 'vinyl aromatic monomer having a polar functional group' refers to an aromatic cyclic compound having a polar functional group and a vinyl group at the same time.

The polymer beads may include the hydrophobic repeating unit and the hydrophilic repeating unit at the same time and may also include many pores on the surface and inside thereof, and therefore, only the dioxin compounds among many components in the liquid extract obtained in Step 1 may be physically and/or chemically adsorbed onto the polymer beads.

Further, the polymer beads may effectively adsorb dioxin compounds by π-π bonds due to the hydrophobic repeating unit, as compared with inorganic particles such as silica particles.

In this regard, the non-polar functional group may be selected from the group consisting of hydrogen; a halogen; a substituted or unsubstituted $C_{1-20}$ alkyl; a substituted or unsubstituted $C_{2-20}$ alkenyl; a substituted or unsubstituted $C_{2-20}$ alkynyl; a substituted or unsubstituted $C_{3-20}$ cycloalkyl; a substituted or unsubstituted $C_{6-20}$ aryl; and a substituted or unsubstituted $C_{7-20}$ aralkyl.

Further, the polar functional group may include heteroatoms such as oxygen, nitrogen, phosphorus, sulfur, silicon, or boron, and may be selected from the group consisting of the following functional groups:

—$R_5$OH, —$R_5$OR$_6$, —OR$_6$, —OC(O)OR$_6$, —$R_5$OC(O) OR$_6$, —$R_5$C(O)OR$_6$, —C(O)R$_6$, —$R_5$C(O)R$_6$, —OC(O)R$_6$, —$R_5$OC(O)R$_6$, —($R_5$O)$_p$—OR$_6$, —(OR$_5$)$_p$—OR$_6$, —C(O)—O—C(O)R$_6$, —$R_5$C(O)—O—C(O)R$_6$, —SR$_6$, —$R_5$SR$_6$, —SSR$_6$, —$R_5$SSR$_6$, —S(=O)R$_6$, —$R_5$S(=O) R$_6$, —$R_5$C(=S)R$_6$, —$R_5$C(=S)SR$_6$, —$R_5$SO$_3$R$_6$, —SO$_3$R$_6$, —$R_5$N=C=S, —N=C=S, —NCO, —$R_5$— NCO, —CN, —$R_5$CN, —NNC(=S)R$_6$, —$R_5$NNC(=S)R$_6$, —NO$_2$, —$R_5$NO$_2$,

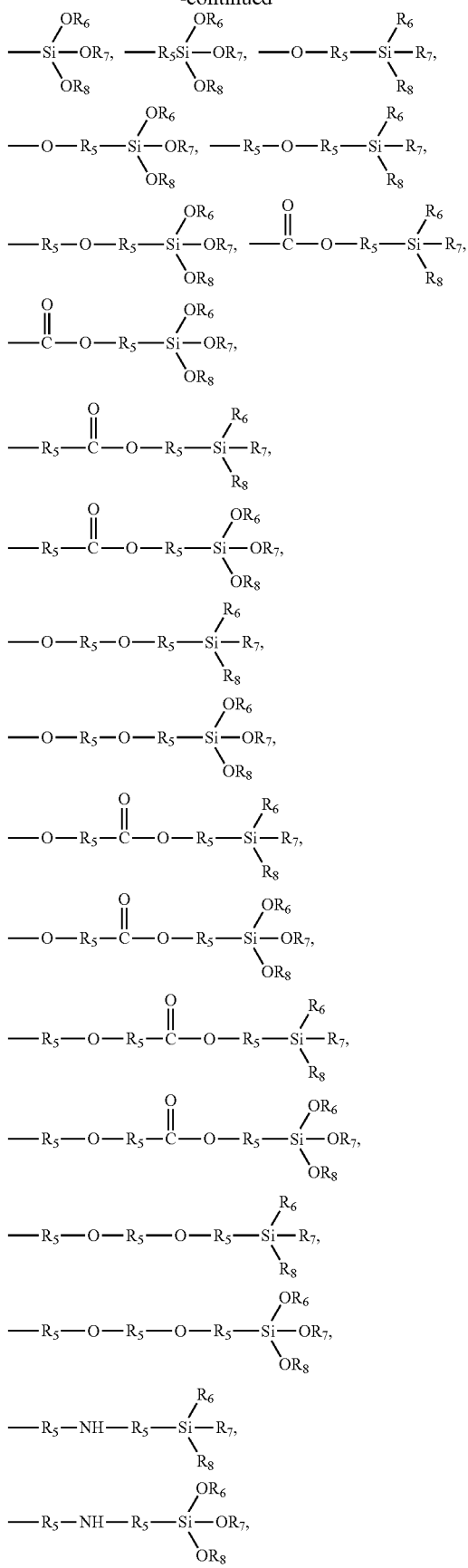

-continued

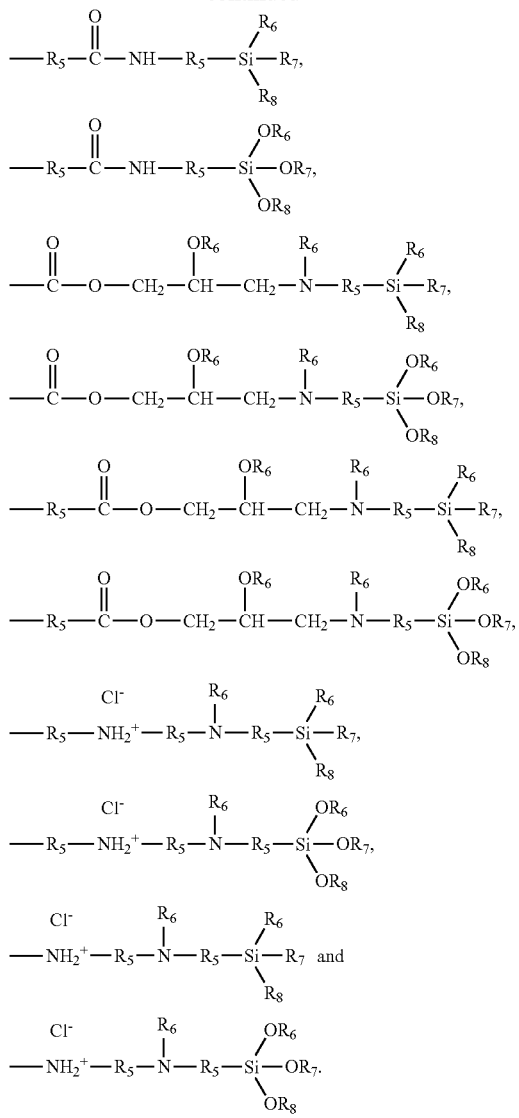

In the above polar functional groups, each p is independently an integer of 1 to 10, $R_5$ is a substituted or unsubstituted $C_{1-20}$ alkylene; a substituted or unsubstituted $C_{2-20}$ alkenylene; a substituted or unsubstituted $C_{2-20}$ alkynylene; a substituted or unsubstituted $C_{3-20}$ cycloalkylene; a substituted or unsubstituted $C_{6-20}$ arylene; a substituted or unsubstituted $C_{7-20}$ ararylene; a substituted or unsubstituted $C_{1-20}$ alkoxylene; or a substituted or unsubstituted $C_{1-20}$ carbonyloxylene, and $R_6$, $R_7$, and $R_8$ are each independently hydrogen; a halogen; a substituted or unsubstituted $C_{1-20}$ alkyl; a substituted or unsubstituted $C_{2-20}$ alkenyl; a substituted or unsubstituted $C_{2-20}$ alkynyl; a substituted or unsubstituted $C_{3-20}$ cycloalkyl; a substituted or unsubstituted $C_{6-20}$ aryl; a substituted or unsubstituted $C_{7-20}$ aralkyl; a substituted or unsubstituted $C_{1-20}$ alkoxy; or a substituted or unsubstituted $C_{1-20}$ carbonyloxy.

The hydrophobic repeating unit derived from the vinyl aromatic monomer having the non-polar functional group may be represented by the following Chemical Formula 1.

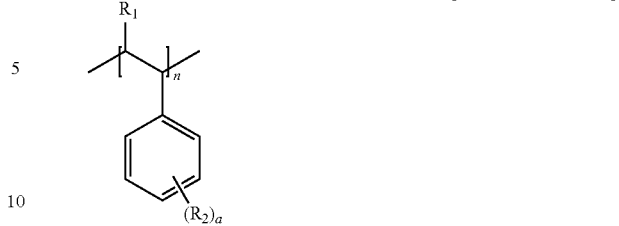

[Chemical Formula 1]

In Chemical Formula 1, $R_1$ is hydrogen or a $C_{1-4}$ alkyl, $R_2$ is hydrogen; a halogen; a substituted or unsubstituted $C_{1-20}$ alkyl; a substituted or unsubstituted $C_{2-20}$ alkenyl; a substituted or unsubstituted $C_{2-20}$ alkynyl; a substituted or unsubstituted $C_{3-20}$ cycloalkyl; a substituted or unsubstituted $C_{6-20}$ aryl; or a substituted or unsubstituted $C_{7-20}$ aralkyl, a is an integer of 0 to 5, and n is 100 to 10,000.

In this regard, when a is 2 or more, two or more of $R_2$ may be the same as or different from each other.

More specifically, in Chemical Formula 1, $R_1$ may be hydrogen or methyl, and $R_2$ may be hydrogen, a halogen, methyl, ethyl, propyl, vinyl, cyclohexyl, or benzene, but is not limited thereto.

Further, the hydrophilic repeating unit derived from the vinyl aromatic monomer having the polar functional group may be represented by the following Chemical Formula 2.

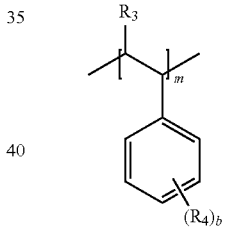

[Chemical Formula 2]

In Chemical Formula 2, $R_3$ is hydrogen or a $C_{1-4}$ alkyl, $R_4$ is a polar functional group; hydrogen; a halogen; a substituted or unsubstituted $C_{1-20}$ alkyl; a substituted or unsubstituted $C_{2-20}$ alkenyl; a substituted or unsubstituted $C_{2-20}$ alkynyl; a substituted or unsubstituted $C_{3-20}$ cycloalkyl; a substituted or unsubstituted $C_{6-20}$ aryl; a substituted or unsubstituted $C_{7-20}$ arylalkyl; or a $C_{7-20}$ alkylaryl, provided that at least one $R_4$ is a polar functional group, b is an integer of 1 to 5, and m is 100 to 10,000.

In this regard, when b is 2 or more, two or more of $R_4$ may be the same as or different from each other.

More specifically, in Chemical Formula 2, $R_3$ may be hydrogen or a methyl, $R_4$ may be a polar functional group, hydrogen, a halogen, methyl, ethyl, propyl, vinyl, cyclohexyl, or benzene, and the polar functional group may be hydroxymethyl, hydroxyethyl, or hydroxypropyl, but is not limited thereto.

Additionally, the polymer beads may further include one or more hydrophilic repeating units represented by the following Chemical Formula 3.

[Chemical Formula 3]

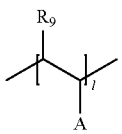

In Chemical Formula 3, $R_9$ is hydrogen or a $C_{1-4}$ alkyl,

A is a substituted or unsubstituted $C_{2-60}$ heteroaromatic cyclic group including one or more heteroatoms selected from the group consisting of N, O, and S; or a substituted or unsubstituted $C_{2-60}$ hetero-non-aromatic cyclic group including one or more heteroatoms selected from the group consisting of N, O, and S, and l is 100 to 10,000.

More specifically, in Chemical Formula 3, $R_9$ may be hydrogen or methyl, and

A may be a substituted or unsubstituted pyrrolyl; a substituted or unsubstituted imidazolyl; a substituted or unsubstituted pyrazolyl; a substituted or unsubstituted pyridinyl; a substituted or unsubstituted pyrazinyl; a substituted or unsubstituted pyrimidinyl; a substituted or unsubstituted pyridazinyl; a substituted or unsubstituted oxazolyl; a substituted or unsubstituted thiazolyl; a substituted or unsubstituted isothiazolyl; a substituted or unsubstituted pyrrolidonyl; a substituted or unsubstituted morpholinyl; a substituted or unsubstituted oxazolidinonyl; or a substituted or unsubstituted caprolactamyl.

Each of the substituents in the above-described chemical formulae is specifically defined as follows.

First, "alkyl" means a linear or branched saturated monovalent hydrocarbon moiety of 1 to 20 carbon atoms, preferably, 1 to 10 carbon atoms. The alkyl group may encompass not only those unsubstituted but also those further substituted with a predetermined substituent to be described later. Examples of the alkyl group may include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl, etc.

"Alkenyl" means a linear or branched monovalent hydrocarbon moiety of 2 to 20 carbon atoms, preferably, 2 to 10 carbon atoms, with at least one carbon-carbon double bond. The alkenyl groups may be linked via carbon atoms including a carbon-carbon double bond, or via saturated carbon atoms. The alkenyl group may encompass not only those unsubstituted but also those further substituted with a predetermined substituent to be described later. Examples of the alkenyl group may include ethenyl, 1-propenyl, 2-propenyl, 2-butenyl, 3-butenyl, pentenyl, 5-hexenyl, dodecenyl, etc.

"Cycloalkyl" means a saturated or unsaturated non-aromatic monovalent monocyclic, bicyclic, or tricyclic hydrocarbon moiety of 3 to 20 ring carbons, and may encompass those further substituted with a predetermined substituent to be described later. Examples of the cycloalkyl may include cyclopropyl, cyclobutyl, cyclopentyl, cyclopentenyl, cyclohexyl, cyclohexenyl, cycloheptyl, cyclooctyl, decahydronaphthalenyl, adamantyl, norbornyl (e.g., bicyclo [2,2,1] hept-5-enyl), etc.

"Aryl" means a monovalent monocyclic, bicyclic, or tricyclic aromatic hydrocarbon moiety of 6 to 20 ring atoms, preferably, 6 to 12 ring atoms, and may encompass those further substituted with a predetermined substituent to be described later. Examples of the aryl group may include phenyl, naphthalenyl, fluorenyl, etc.

"Alkoxyaryl" means a moiety in which at least one hydrogen atom of the aryl group defined above is substituted with an alkoxy group. Examples of the alkoxyaryl group may include methoxyphenyl, ethoxyphenyl, propoxyphenyl, butoxyphenyl, pentoxyphenyl, heptoxyphenyl, heptoxy, octoxy, nanoxy, methoxybiphenyl, methoxynaphthalenyl, methoxyfluorenyl, methoxyanthracenyl, etc.

"Aralkyl" means a moiety in which at least one hydrogen atom of the alkyl group defined above is substituted with an aryl group, and may encompass those further substituted with a predetermined substituent to be described later. Examples of the aralkyl group may include benzyl, benzhydryl, trityl, etc.

"Alkynyl" means a linear or branched monovalent hydrocarbon moiety of 2 to 20 carbon atoms, preferably 2 to 10 carbon atoms, and more preferably 2 to 6 carbon atoms, with at least one carbon-carbon triple bond. The alkynyl groups may be linked via carbon atoms including a carbon-carbon triple bond, or via saturated carbon atoms. The alkynyl group may encompass those further substituted with a predetermined substituent to be described later. Examples of the alkynyl group may include ethinyl, propynyl, etc.

"Alkylene" means a linear or branched saturated bivalent hydrocarbon moiety of 1 to 20 carbon atoms, preferably, 1 to 10 carbon atoms, and more preferably 1 to 6 carbon atoms. The alkylene group may be arbitrarily substituted with one or more halogen substituents. Examples of the alkylene group may include methylene, ethylene, propylene, butylene, hexylene, etc.

"Alkenylene" means a linear or branched bivalent hydrocarbon moiety of 2 to 20 carbon atoms, preferably, 2 to 10 carbon atoms, and more preferably 2 to 6 carbon atoms, with at least one carbon-carbon double bond. The alkenylene groups may be linked via carbon atoms including a carbon-carbon double bond, and/or via saturated carbon atoms. The alkenylene group may encompass those further substituted with a predetermined substituent to be described later.

"Cycloalkylene" means a saturated or unsaturated non-aromatic bivalent monocyclic, bicyclic, or tricyclic hydrocarbon moiety of 3 to 20 ring carbons, and may encompass those further substituted with a predetermined substituent to be described later. Examples of the cycloalkylene group may include cyclopropylene, cyclobutylene, etc.

"Arylene" means a bivalent monocyclic, bicyclic, or tricyclic aromatic hydrocarbon moiety of 6 to 20 ring atoms, preferably, 6 to 12 ring atoms, and may encompass those further substituted with a predetermined substituent to be described later. The aromatic moiety includes only carbon atoms. Examples of the arylene group may include phenylene, etc.

"Aralkylene" means a bivalent moiety in which at least one hydrogen atom of the alkyl group defined above is substituted with an aryl group, and may encompass those further substituted with a predetermined substituent to be described later. Examples of the aralkylene group may include benzylene, etc.

"Alkynylene" means a linear or branched bivalent hydrocarbon moiety of 2 to 20 carbon atoms, preferably 2 to 10 carbon atoms, and more preferably 2 to 6 carbon atoms, with at least one carbon-carbon triple bond. The alkynylene groups may be linked via carbon atoms including a carbon-carbon triple bond, or via saturated carbon atoms. The alkynylene group may encompass those further substituted with a predetermined substituent to be described later. Examples of the alkynylene group may include ethinylene, propynylene, etc.

"Aromatic heterocyclic group" means a monovalent group including at least one heteroatom selected from the group consisting of N, O, and S as a ring-forming atom, and having 2 to 60 carbon atoms in a molecule, in which the entire molecule has aromaticity.

"Non-aromatic heterocyclic group" means a monovalent group including at least one heteroatom selected from the group consisting of N, O, and S as a ring-forming atom, and having 2 to 60 carbon atoms in a molecule, in which the entire molecule has non-aromaticity.

Those "substituted or unsubstituted" with the above-described substituents encompass not only these individual substituents themselves but also those further substituted with a predetermined substituent. In the present specification, unless explicitly described otherwise, examples of the substituent to be further substitutable in each substituent may include a halogen, alkyl, alkenyl, alkynyl, haloalkyl, haloalkenyl, haloalkynyl, aryl, haloaryl, arylalkyl, haloarylalkyl, alkoxy, haloalkoxy, carbonyloxy, halocarbonyloxy, aryloxy, haloaryloxy, silyl, siloxy, or "polar functional groups including oxygen, nitrogen, phosphorus, sulfur, silicon, or boron" to be described below, etc.

The polymer beads may include the hydrophobic repeating unit and the hydrophilic repeating unit at a molar ratio of 99:1 to 40:60. That is, a ratio of n of Chemical Formula 1 to m of Chemical Formula 2 may be 99:1 to 40:60. Within the above-described range, selectivity for the dioxin compounds may be improved.

Specifically, the polymer bead may be a copolymer including one kind of the hydrophobic repeating unit derived from the vinyl aromatic monomer having the non-polar functional group and one kind of the hydrophilic repeating unit derived from the vinyl aromatic monomer having the polar functional group; a terpolymer including two kinds of the hydrophobic repeating units derived from the vinyl aromatic monomer having the non-polar functional group and one kind of the hydrophilic repeating unit derived from the vinyl aromatic monomer having the polar functional group; or a terpolymer including one kind of the hydrophobic repeating unit derived from the vinyl aromatic monomer having the non-polar functional group and two kinds of the hydrophilic repeating units derived from the vinyl aromatic monomer having the polar functional group.

More specifically, the polymer bead may be a copolymer including one kind of the hydrophobic repeating unit represented by Chemical Formula 1 and one kind of the hydrophilic repeating unit represented by Chemical Formula 2; a terpolymer including one kind of the hydrophobic repeating unit represented by Chemical Formula 1 and two kinds of the hydrophilic repeating unit represented by Chemical Formula 2; or a terpolymer including two kinds of the hydrophobic repeating unit represented by Chemical Formula 1 and one kind of the hydrophilic repeating unit represented by Chemical Formula 2.

Alternatively, the polymer bead may be a terpolymer including one kind of the hydrophobic repeating unit represented by Chemical Formula 1, one kind of the hydrophilic repeating unit represented by Chemical Formula 2, and one kind of the hydrophilic repeating unit represented by Chemical Formula 3; or a tetrapolymer including one kind of the hydrophobic repeating unit represented by Chemical Formula 1, one kind of the hydrophilic repeating unit represented by Chemical Formula 2, and two kinds of the hydrophilic repeating unit represented by Chemical Formula 3.

For example, the polymer bead may be one or more selected from the group consisting of a polystyrene-polyvinylphenol copolymer, a polystyrene-polyvinylphenylmethanol copolymer, a polydivinylbenzene-polyvinylphenol copolymer, a polydivinylbenzene-polyvinylphenylmethanol copolymer, a polystyrene-polydivinylbenzene-polyvinylphenol terpolymer, and a polystyrene-polydivinylbenzene-polyvinylphenylmethanol terpolymer.

In this regard, the copolymer may be a random copolymer in which the hydrophobic repeating unit and the hydrophilic repeating unit are randomly arranged, or a block copolymer in which blocks of the repeating units are joined by covalent bonds. Otherwise, the copolymer may be an alternating copolymer in which the repeating units in the square brackets of Chemical Formula 1 are arranged in an alternating manner, or a graft copolymer in which any one of the repeating units is bonded in a branched form, but the arrangement of the repeating units is not limited. Among them, the copolymer may be a block copolymer in which one or more kinds of the hydrophobic repeating units and one or more kinds of the hydrophilic repeating units are connected in a block form.

Further, the polymer bead may have a spherical particle form. Specifically, as the shape of the polymer bead is closer to a spherical form, the polymer bead is more advantageous in terms of recovery rate due to uniform packing.

Such spherical polymer beads may have an average particle size of 10 μm to 100 μm. In the case of polymer particles having an average particle size of less than 10 μm, there is a possibility that pressure may be increased during bead packing and solvent injection, and thus the recovery rate may be reduced. In the case of polymer particles having an average particle size of more than 100 μm, it is difficult to disperse beads, and thus there is a difficulty in homogeneous packing.

The polymer beads may have an average pore size of 10 nm to 30 nm. When the polymer beads satisfy the above range, the dioxin compounds may be more effectively adsorbed onto the polymer beads. The average pore size may be measured using an analytical instrument such as a capillary flow porometer and a scanning electron microscope (SEM).

In this regard, a column packed with the polymer beads may be washed with a hydrophilic solvent. Through washing, impurities which may exist in the polymer beads may be removed, and as a result, dioxin compounds may be effectively adsorbed onto the pores on the surface of and inside the polymer beads. The hydrophilic solvent may be the same as a first solvent of Step 3 described below.

A time required for Step 2 may be 0.2 minutes to 10 minutes.

Step of Removing Substances Which are Not Adsorbed onto Polymer Beads by Passing First Solvent Through Column Packed with Dioxin Compound-Adsorbed Polymer Beads (Step 3)

Step 3, one of purification steps for analyzing dioxin compounds, is a step of removing liquid extract components remaining after Step 2, which are not adsorbed onto the polymer beads, by using a first solvent as a mobile phase.

A hydrophilic solvent effective to remove polar substances interfering with purification is used as the first solvent.

For example, the first solvent may be one or more selected from the group consisting of methanol, ethanol, n-propanol, isopropanol, n-butanol, ethyl acetate, tetrahydrofuran (THF), dichloromethane, acetone, and acetonitrile. Methanol is preferred, because methanol is well evaporated after passing through the column and thus does not remain in the beads, thereby increasing purification efficiency.

Further, the passing of the first solvent may occur in free fall or by a separate vacuum pump, and a time required for passing of the first solvent may be 0.2 minutes to 10 minutes. In addition, the first solvent having passed through the column may be recovered by a receiver connected to the column.

Step of Obtaining Eluate Including Dioxin Compounds which are Eluted in Second Solvent by Passing Second Solvent Through Column Packed with Polymer Beads from which Unadsorbed Substances have been Removed (Step 4)

Step 4, one of purification steps for analyzing dioxin compounds, is a step of eluting dioxin compounds from the polymer beads to a second solvent by using the second solvent as a mobile phase. An eluate thus obtained means a solution in which the dioxin compounds are dissolved in the second solvent.

A hydrophobic solvent that is effective in eluting dioxin compounds adsorbed onto the polymer beads is used as the second solvent.

For example, the second solvent may be one or more selected from the group consisting of toluene, hexane, benzene, diethyl ether, and chloroform. In this regard, toluene is preferred, because toluene may prevent reduction of a recovery rate during concentration of the eluate.

Further, the introduced second solvent may pass through the column in free fall, and a time required may be 1 minute to 30 minutes. Further, the obtained eluate may be recovered by the receiver connected to the column.

Steps 2 to 4 may be regarded as purification steps for analyzing dioxin compounds as described above, and a total time required for the purification steps may be 1.4 minutes to 50 minutes, which is remarkably short as compared to 5 days which is a time taken for purification according to 「 the Official Method of Persistent Organic Pollutants 」 announced by the Ministry of Environment in 2007.

After Step 4, steps of concentrating the eluate, and adding an internal standard for syringe addition to the concentrated eluate, may be further included.

The 「 internal standard for syringe addition 」 refers to an organic compound that is similar to an analyte in chemical structure or chemical properties but is not found in a sample medium, and the internal standard for syringe addition may be added after the pretreatment step prior to instrumental analysis in order to determine reproducibility and accuracy of the analytical method. The internal standard for syringe addition may be, for example, $^{13}C$-1, 2, 3, 4-TeCDD and $^{13}C$-1, 2, 3, 7, 8, 9-HxCDD, etc., but is not limited thereto.

Analytical Method for Dioxin Compounds

An analytical method for dioxin compounds, including the step of performing instrumental analysis of the sample pretreated through the above-described pretreatment method is provided. In this regard, the final solution may be the eluate obtained through Step 4 or a liquid concentrate obtained by adding the internal standard for syringe addition to the concentrated eluate.

The instrumental analysis may be performed by gas chromatography/high-resolution mass spectrometry. The gas chromatography/high-resolution mass spectrometry may be an instrument in which gas chromatography is connected with high-resolution mass spectrometry, and a sample separated by the gas chromatography is analyzed by high-resolution mass spectrometry. In the instrumental analysis, for example, gas chromatography/high-resolution mass spectrometry at a resolution of 10,000 or more may be used.

Accuracy of the analytical method for dioxin compounds may be presented as a recovery rate of the internal standard for purification. Therefore, the measurement results of the recovery rates of the internal standard for purification are generally presented together with sample analysis results in order to examine reliability of the sample analysis results.

According to the notice of the Ministry of Environment, the recovery rate of each internal standard for purification must satisfy 50% to 120% in order to validate reliability of the analytical method for dioxin compounds. In the above analytical method for dioxin compounds, the recovery rate of the internal standard for purification may be about 80% to about 130%, indicating remarkable improvement, as compared with 60% to 70% which is the recovery rate of the internal standard for purification measured according to the known test method of FIG. 1 announced by the Ministry of Environment.

Effect of the Invention

The present invention relates to a pretreatment method for analyzing dioxin compounds and an analytical method using the same, in which a column packed with polymer beads capable of selectively adsorbing dioxin compounds is used in a purification step during pretreatment, thereby remarkably reducing a time required for pretreatment and improving a recovery rate of an internal standard for purification.

BRIEF DESCRIPTION OF DRAWINGS

FIG. 1 illustrates an analytical method for dioxins and furans in a wastewater sample according to 「 the Official Method of Persistent Organic Pollutants 」 announced by the Ministry of Environment in 2007;

FIG. 2 shows results of SEM analysis of polymer bead 1 prepared in Preparation Example 1, polymer bead 2 prepared in Preparation Example 2, and $C_{18}$ bead used in Comparative Example 1;

FIG. 3 shows a comparison of recovery rates of internal standards for purification according to analytical methods of Example 1 and Comparative Example 1;

FIG. 4 shows a comparison of recovery rates of internal standards for purification according to analytical methods of Example 1 and Comparative Example 2;

FIG. 5 shows results of monitoring lock mass by HRGC-HRMS of Example 1;

FIG. 6 shows results of monitoring lock mass by HRGC-HRMS of Comparative Example 1;

FIG. 7 shows a comparison of quantitative analysis results according to analytical methods of Example 2 and Comparative Example 3; and FIG. 8 shows a comparison of recovery rates of internal standards for purification according to analytical methods of Example 2 and Comparative Example 3.

DETAILED DESCRIPTION OF THE EMBODIMENTS

Hereinafter, preferred examples will be provided for better understanding of the present invention. However, the following examples are provided only for understanding the present invention more easily, and the content of the present invention is not limited thereby.

Preparation Example 1: Preparation of Polymer Bead 1

Polyvinyl phenylmethanol was dissolved in ethanol in a 3-neck round bottom flask under argon gas. 2,2'-azobis(2-methylpropionitrile) was added thereto, and heated to 70° C. When the temperature reached 70° C., a 2,2'-azobis(2-methylpropionitrile)-containing styrene and divinylbenzene solution was slowly added at a constant rate, and then allowed to react for 24 hours or more. As a result, Polymer Bead 1 of a polystyrene-polydivinylbenzene-polyvinylphenylmethanol terpolymer (polystyrene repeating unit: polydivinylbenzene repeating unit:polyvinylphenylmethanol repeating unit=34:34:32 (molar ratio)) was prepared.

Preparation Example 2: Preparation of Polymer Bead 2

Polyvinyl phenylmethanol was dissolved in ethanol in a 3-neck round bottom flask under argon gas. 2,2'-azobis(2-methylpropionitrile) was added thereto, and heated to 70° C. When the temperature reached 70° C., a 2,2'-azobis(2-methylpropionitrile)-containing styrene and divinylbenzene solution was slowly added at a constant rate, and then allowed to react for 24 hours or more. As a result, Polymer Bead 2 of a polystyrene-polydivinylbenzene-polyvinylphenylmethanol terpolymer (polystyrene repeating unit: polydivinylbenzene repeating unit:polyvinylphenylmethanol repeating unit=35:50:15 (molar ratio)) was prepared.

Experimental Example 1: Analysis of Bead Morphology

In order to examine particle morphology and particle size of Polymer Bead 1 prepared in Preparation Example 1, Polymer Bead 2 prepared in Preparation Example 2, and $C_{18}$ beads (manufactured by Agilent) to be used in Comparative Example 1 described below, SEM analysis was performed, and results are shown in FIG. 2, respectively.

As shown in FIG. 2, it was found that Polymer Beads 1 and 2 prepared in the preparation examples had a spherical particle shape whereas, Upti-Clean $C_{18}$ beads had an irregular particle shape. It was also found that Polymer Bead 1 had an average particle size of 50 μm to 85 μm and Polymer Bead 2 had an average particle size of 34 μm to 55 μm, and Polymer Bead 2 had a more regular shape.

Example 1: Analysis of Recovery Rate of Standard for Purification Using Column Packed with Polymer Bead 2

(Purification Step)
A column was packed with Polymer Bead 2 prepared in Preparation Example 2, and methanol was passed through the column to remove remaining impurities in the polymer beads.

Thereafter, 20 μl of a standard for purification (EDF8999) was passed through the column packed with Polymer Bead 2 to adsorb dioxin compounds onto Polymer Bead 2.

Thereafter, methanol was passed through the column packed with Polymer Bead 2 onto which dioxin compounds were adsorbed, to remove components that were not adsorbed onto Polymer Bead 2.

Next, toluene was introduced into the column packed with the polymer beads from which unadsorbed components were removed, to elute Polymer Bead 2-adsorbed dioxin compounds in toluene, and this solution was collected in a receiver connected to the column to obtain 3 mL of eluate. In this regard, a total time required for the purification was 10 minutes.

(Concentration Step)
The eluate was concentrated to 100 μl by a nitrogen concentrator and a TURBOVAP® concentrator (an instrument for solvent evaporation).

(Instrumental Analysis Step)
Instrumental analysis step was performed by the following method.
① 100 μl of the liquid concentrate was transferred into a vial and the liquid concentrate was subjected to air-drying.
② When 10 μl of the liquid concentrate was left in an insert, the liquid concentrate was rinsed with 0.1 mL of toluene, and subjected to air-drying in a heating block at 40° C.
③ The procedure of ② was repeated three times.
④ When about 10 μl of toluene was finally left in the insert, 10 μl of a stock solution (EDF-5999) which is an internal standard for syringe addition was added thereto.
⑤ Instrumental analysis was performed by HRGC-HRMS.

Example 2: Analysis of Dioxin Compounds in Sample Using Column Packed with Polymer Bead 2

(Sampling Step)
An amber glass bottle with a TEFLON® (a brand name for synthetic polytetrafluoroethylene) stopper which was washed with a solvent was used to collect 2 L or more of actual wastewater from a vinyl chloride monomer (VCM) plant at a depth of 30 cm to 50 cm or to collect 2 L or more of the wastewater at 1 minute after turning on a faucet while stirring a storage tank if the faucet was connected to the sampling point.

(Extraction and Concentration Steps)
The collected sample was subjected to liquid-liquid extraction and Soxhlet extraction using a separatory funnel, a shaker, and a Soxhlet extractor to obtain a liquid extract. Thereafter, a predetermined amount of the liquid extract was aliquoted and 2 ng of the internal standard for purification was added thereto, and this mixture was concentrated using a TURBOVAP® (an instrument for solvent evaporation) manufactured by Zymark, Corp. to obtain 1 ml of a concentrate.

After the sampling, extraction, and concentration steps, the purification step was performed in the same manner as in Example 1 to analyze dioxin compounds in the sample. In this regard, a total time required for the purification step was 20 minutes.

Comparative Example 1: Analysis of Recovery Rate of Standard for Purification Using Column Packed with $C_{18}$ Beads A recovery rate of the standard for purification was analyzed in the same manner as in Example 1, except that a column packed with commercially available $C_{18}$ beads (silica beads, manufactured by Agilent Corp.) was used in the purification step, instead of the column packed with Polymer Bead 2. In this regard, a total time required for the purification step was 10 minutes.

Comparative Example 2: Analysis of Recovery Rate of Standard for Purification Using Column Packed with Oasis HLB Beads A recovery rate of the standard for purification was analyzed in the same manner as in Example 1, except that a column packed with commercially available Oasis HLB beads (polydivinylbenzene-polyN-vinylpyrrolidone copolymer) having an average particle size of 30 μm (manufactured by Water Corp.) was used in the purification step, instead of the column packed with Polymer bead 2. In this regard, a total time required for the purification step was 10 minutes.

Comparative Example 3: Analysis of Dioxin Compounds in Sample According to Notice of Ministry of Environment In the sampling step, actual wastewater of the vinyl chloride monomer (VCM) plant was collected as a sample, and dioxin compounds in the sample were analyzed according to the test methods for dioxins and furans in wastewater samples in the Official Method of Unintentionally Produced Persistent Organic Pollutants announced by the Ministry of Environment. In this regard, a total time required for the purification step was 5 days.

Experimental Example 2: Comparison of Recovery Rates of Standards for Purification According to Kind of Beads Recovery rates in the analytical methods for dioxin compounds of Example 1, Comparative Example 1, and Comparative Example 2 were calculated by the following method.

① Recovery rates of $^{37}$Cl-2,3,7,8-TeCDD which is an internal standard for sampling and 15 kinds of internal standards for purification were calculated using $^{13}$C-1,2,3,4-TeCDD and $^{13}$C-1,2,3,7,8,9-HxCDD which are used as internal standards for syringe addition.

② A relative response factor (RRF) of the isotope substituent internal standard to $^{13}$C-1,2,3,4-TeCDD and $^{13}$C-1,2,3,7,8,9-HxCDD which are internal standards for syringe addition was calculated using calibration curve data according to the following Equation 1.

$$RRF = \frac{(A1_n + A2_n)}{(A1_I + A2_I)} \times \frac{(C_I)}{(C_n)} \quad \text{[Equation 1]}$$

In Equation 1,
$A1_n$ and $A2_n$ represent peak areas of primary and secondary selected ions for the standard for quantification, respectively,
$A1_I$ and $A2_I$ represent peak areas of primary and secondary selected ions for the internal standard for syringe addition, respectively,
$C_I$ represents a concentration of the internal standard for syringe addition, and
$C_n$ represents a concentration of the standard for quantification.

③ Recovery rates of 4,5 chloride and 6,7,8 chloride among the internal standards for sampling and purification were calculated by $^{13}$C-1,2,3,4-TeCDD and $^{13}$C-1,2,3,7,8,9-HxCDD, respectively, from the calculated RRF value and sample analysis data according to the following Equation 2.

$$\text{Recovery rate (\%)} = \frac{(A1_n + A2_n)}{(A1_I + A2_I)} \times \frac{1}{RRF} \times \frac{(C_I)}{(C_n)} \quad \text{[Equation 2]}$$

In Equation 2,
$A1_n$ and $A2_n$ represent peak areas of primary and secondary selected ions for the standard for purification, respectively,
$A1_I$ and $A2_I$ represent peak areas of primary and secondary selected ions for the internal standard for syringe addition, respectively,
$C_I$ represents a concentration of the internal standard for syringe addition,
$C_n$ represents a concentration of the standard for quantification, and
RRF represents a relative response factor.

The recovery rates of the internal standards for purification in the analysis of Example 1 were calculated twice by the above method, and the recovery rates of the internal standards for purification in the analysis of Comparative Examples 1 and 2 were calculated three times by the above method, and results are shown in FIGS. 3 and 4, respectively.

As shown in FIGS. 3 and 4, when the column packed with Polymer Bead 2 prepared in Preparation Example 2 was used in the purification step of Example 1, the recovery rates of the internal standards for purification were about 90% to about 130%. In contrast, when the column packed with silica beads and the column packed with Oasis HLB beads (polydivinylbenzene-polyN-vinylpyrrolidone copolymer) were used in Comparative Examples 1 and 2, respectively, there were some congeners showing the recovery rates of internal standards of less than 80%, and there was a large deviation in the recovery rate between measurements.

Further, lock masses of HRGC-HRMS in the analysis of Example 1 and Comparative Example 1 were monitored and are shown in FIGS. 5 and 6. As shown in FIGS. 5 and 6, vibration of the lock mass occurred in Comparative Example 1, unlike in Example 1, indicating that purification efficiency was poor and additional purification of the analyte was required.

Experimental Example 3: Quantification Results of Dioxin Compounds in Actual Wastewater In order to examine whether quantification results of dioxin compounds in actual wastewater are valid, quantification analysis (measurement of toxicity equivalency factor) of 17 kinds of dioxin compounds (7 kinds of PCDDs and 10 kinds of PCDFs) was performed according to the analytical methods of Example 2 and Comparative Example 3, and results are shown in FIG. 7. In particular, measurement for Example 1 was performed in triplicate, and average relative response factor ($RRF_{avg}$), standard deviation (SD), and relative standard deviation (RSD) of the quantitative values were calculated according to the following Equations 3 to 5, respectively.

$$RRF_{avg.} = \frac{\sum_{i=1}^{n} RRF_i}{n} \quad \text{[Equation 3]}$$

$$SD = \sqrt{\frac{\sum_{i=1}^{n}(RRF_i - RRF_{avg.})^2}{n-1}} \quad \text{[Equation 4]}$$

$$RSD = \frac{SD}{RRF_{avg.}} \times 100 \quad \text{[Equation 5]}$$

The calculation results of Equations 3 to 5 showed that the relative standard deviation (RSD) of the quantitative values of Example 2 was 7.6%, which is in accordance with the dual measurement criteria, indicating validity of the analytical method for dioxin compounds of Example 2. Here, 'dual measurement' means that the operation after extraction is repeated for the same sample twice or more under the same conditions, an average value of both analytical values (total TEQ concentration of dioxin compounds) of an object at a concentration higher than a limit of quantification is obtained, and then it is confirmed whether the difference of each value with respect to the average value is 30% or less.

In the same manner as in Experimental Example 2, recovery rates of the internal standards for purification of Example 2 and Comparative Example 3 were measured. In particular, measurement for Example 2 was performed in triplicate, and reliability of the analytical method was determined. The results are shown in FIG. 8.

As shown in FIG. 8, when the column packed with Polymer Bead 2 prepared in Preparation Example 2 was used in the purification step of Example 2, the recovery rates of the internal standards for purification were about 86% to about 112%. In contrast, the recovery rates of the internal standards for purification in Comparative Example 3 according to the notice of the Ministry of Environment were only about 60% to about 70%. Further, most of 16 kinds of congeners which are the internal standards for purification showed high recovery rates in the analytical method of Example 2, as compared to that of Comparative Example 2.

Accordingly, it can be seen that when the pretreatment method for analyzing dioxin compounds and the analytical method using the same of the present invention are employed, a time required for the purification step during pretreatment may be remarkably reduced, and recovery rates of the internal standards for purification may be improved.

The invention claimed is:

1. A pretreatment method for analyzing dioxin compounds, the method comprising the steps of:
   1) obtaining a liquid extract including dioxin compounds from a sample;
   2) adsorbing the dioxin compounds onto polymer beads by passing the liquid extract through a column packed with the polymer beads;
   3) removing substances which are not adsorbed onto the polymer beads by passing a first solvent through the column packed with the dioxin compound-adsorbed polymer beads; and
   4) obtaining an eluate including dioxin compounds which are eluted in a second solvent by passing the second solvent through the column packed with polymer beads from which the unadsorbed substances have been removed, wherein the polymer beads are porous particles including one or more hydrophobic repeating units derived from a vinyl aromatic monomer having a non-polar functional group and one or more hydrophilic repeating units derived from a vinyl aromatic monomer having a polar functional group, and wherein the polymer beads further include one or more hydrophilic repeating units represented by the following Chemical Formula 3:

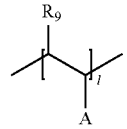

Chemical Formula 3 wherein, in Chemical Formula 3,
$R_9$ is hydrogen or a $C_{1-4}$ alkyl,
A is a substituted or unsubstituted $C_{2-60}$ heteroaromatic cyclic group including one or more heteroatoms selected from the group consisting of N, O, and S; or a substituted or unsubstituted $C_{2-60}$ hetero-non-aromatic cyclic group including one or more heteroatoms selected from the group consisting of N, O, and S, and
1 is 100 to 10,000.

2. The pretreatment method for analyzing dioxin compounds of claim 1,
wherein the dioxin compounds are polychlorinated dibenzo-p-dioxins (PCDDs), polychlorinated dibenzofurans (PCDFs), or a combination thereof.

3. The pretreatment method for analyzing dioxin compounds of claim 1,
wherein extraction of the liquid extract is performed by liquid-liquid extraction, solid phase extraction, Soxhlet extraction, or a combination thereof.

4. The pretreatment method for analyzing dioxin compounds of claim 1,
wherein the polymer beads include the hydrophobic repeating unit and the hydrophilic repeating unit at a molar ratio of 99:1 to 40:60.

5. The pretreatment method for analyzing dioxin compounds of claim 1,
wherein the hydrophobic repeating unit derived from the vinyl aromatic monomer having the non-polar functional group is represented by the following Chemical Formula 1:

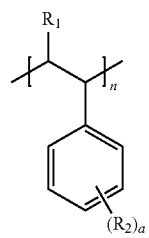

[Chemical Formula 1]

wherein, in Chemical Formula 1,
$R_1$ is hydrogen or a $C_{1-4}$ alkyl,
$R_2$ is a halogen; a substituted or unsubstituted $C_{1-20}$ alkyl; a substituted or unsubstituted $C_{2-20}$ alkenyl; a substituted or unsubstituted $C_{2-20}$ alkynyl; a substituted or unsubstituted $C_{3-20}$ cycloalkyl; a substituted or unsubstituted $C_{6-20}$ aryl; or a substituted or unsubstituted $C_{7-20}$ aralkyl,
a is an integer of 0 to 5, and
n is 100 to 10,000.

6. The pretreatment method for analyzing dioxin compounds of claim 1,
  wherein the hydrophilic repeating unit derived from the vinyl aromatic monomer having the polar functional group is represented by the following Chemical Formula 2:

[Chemical Formula 2]

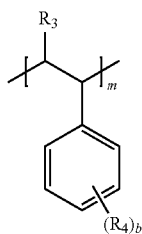

in Chemical Formula 2,
$R_3$ is hydrogen or a $C_{1-4}$ alkyl,
$R_4$ is a polar functional group; a halogen; a substituted or unsubstituted $C_{1-20}$ alkyl; a substituted or unsubstituted $C_{2-20}$ alkenyl; a substituted or unsubstituted $C_{2-20}$ alkynyl; a substituted or unsubstituted $C_{3-20}$ cycloalkyl; a substituted or unsubstituted $C_{6-20}$ aryl; a substituted or unsubstituted $C_{7-20}$ arylalkyl; or a $C_{7-20}$ alkylaryl, provided that at least one $R_4$ is a polar functional group,
b is an integer of 1 to 5, and
m is 100 to 10,000.

7. The pretreatment method for analyzing dioxin compounds of claim 1,
  wherein the polar functional group is selected from the group consisting of the following functional groups:
  —$R_5$OH, —$R_5$O$R_6$, —O$R_6$, —OC(O)O$R_6$, —$R_5$OC(O)O$R_6$, —C(O)O$R_6$, —$R_5$C(O)O$R_6$, —C(O)$R_6$, —$R_5$C(O)$R_6$, —OC(O)$R_6$, —$R_5$OC(O)$R_6$, —($R_5$O)$_p$—O$R_6$, —(O$R_5$)$_p$—O$R_6$, —C(O)—O—C(O)$R_6$, —$R_5$C(O)—O—C(O)$R_6$, —S$R_6$, —$R_5$S$R_6$, —SS$R_6$, —$R_5$SS$R_6$, —S(=O)$R_6$, —$R_5$S(=O)$R_6$, —$R_5$C(=S)$R_6$, —$R_5$C(=S)S$R_6$, —$R_5$SO$_3$$R_6$, —SO$_3$$R_6$, —$R_5$N=C=S, —N=C=S, —NCO, —$R_5$—NCO, —CN, —$R_5$CN, —NNC(=S)$R_6$, —$R_5$NNC(=S)$R_6$, —NO$_2$, —$R_5$NO$_2$,

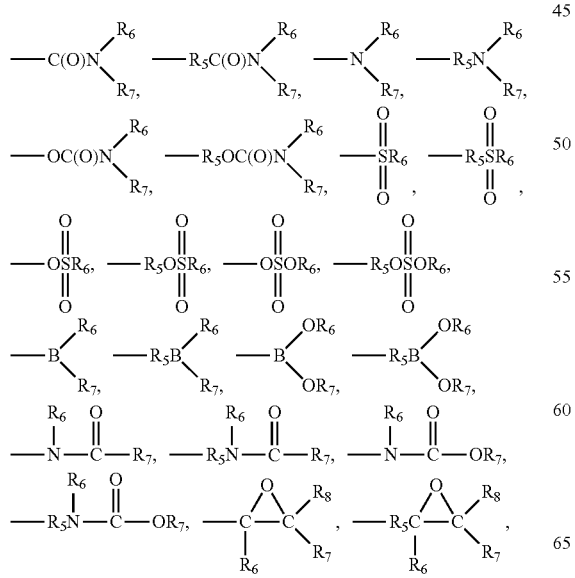

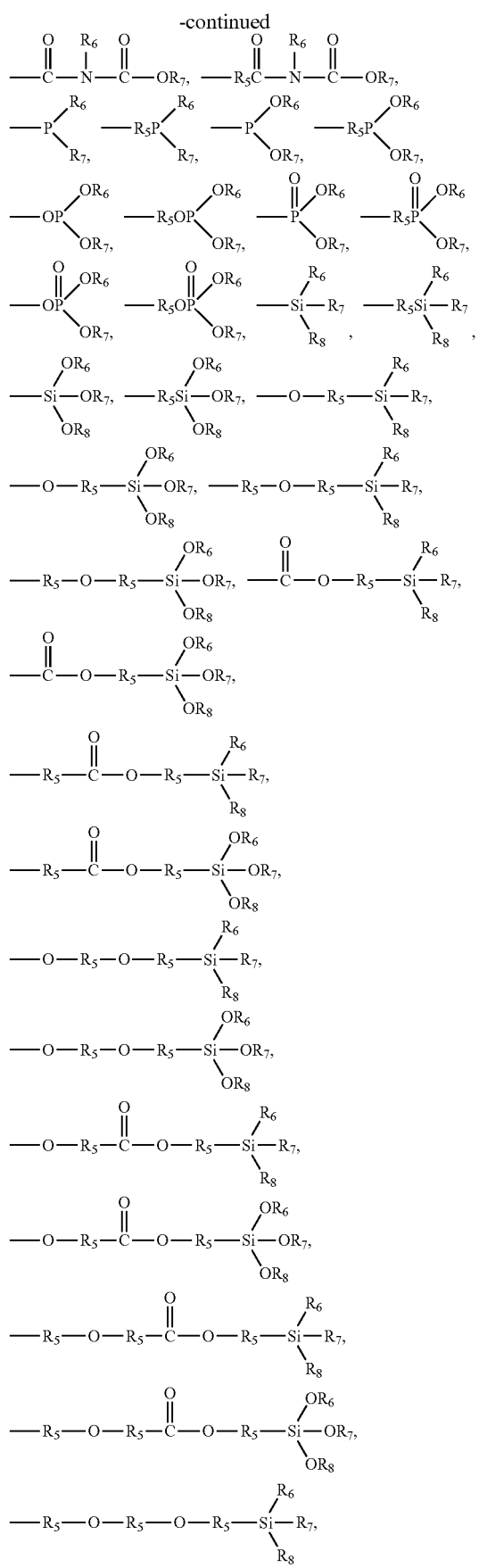

-continued

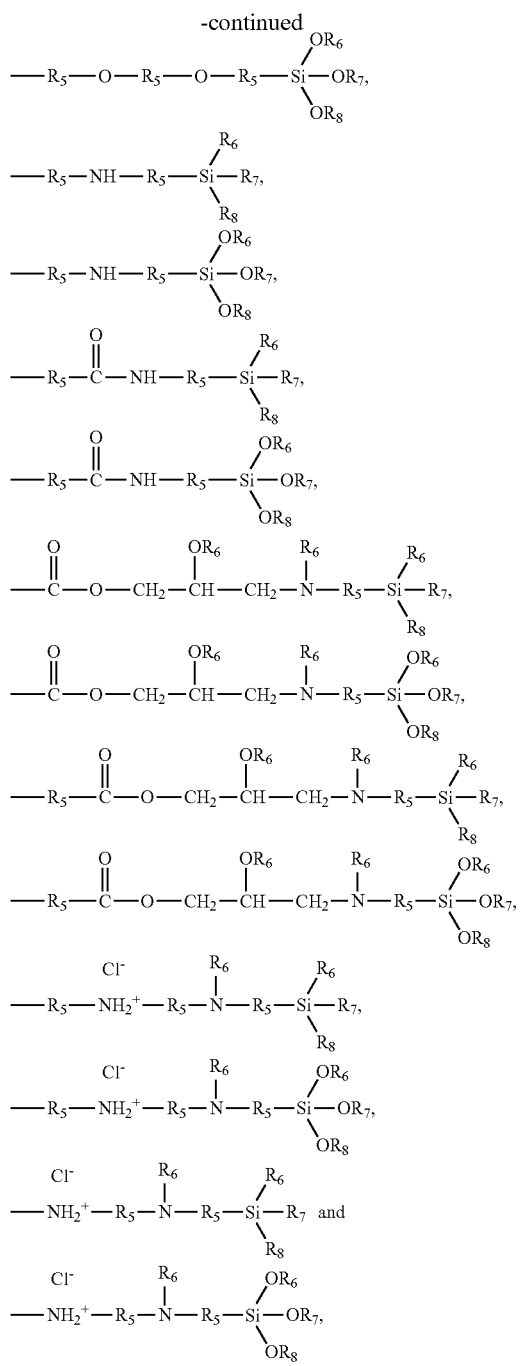

wherein, in the above polar functional groups,
each p is independently an integer of 1 to 10,
$R_5$ is a substituted or unsubstituted $C_{1-20}$ alkylene; a substituted or unsubstituted $C_{2-20}$ alkenylene; a substituted or unsubstituted $C_{2-20}$ alkynylene; a substituted or unsubstituted $C_{3-20}$ cycloalkylene; a substituted or unsubstituted $C_{6-20}$ arylene; a substituted or unsubstituted $C_{7-20}$ ararylene; a substituted or unsubstituted $C_{1-20}$ alkoxylene; or a substituted or unsubstituted $C_{1-20}$ carbonyloxylene, and
$R_6$, $R_7$, and $R_8$ are each independently hydrogen; a halogen; a substituted or unsubstituted $C_{1-20}$ alkyl; a substituted or unsubstituted $C_{2-20}$ alkenyl; a substituted or unsubstituted $C_{2-20}$ alkynyl; a substituted or unsubstituted $C_{3-20}$ cycloalkyl; a substituted or unsubstituted $C_{6-20}$ aryl; a substituted or unsubstituted $C_{7-20}$ aralkyl; a substituted or unsubstituted $C_{1-20}$ alkoxy; or a substituted or unsubstituted $C_{1-20}$ carbonyloxy.

8. The pretreatment method for analyzing dioxin compounds of claim 1,
wherein in Chemical Formula 3,
A is a substituted or unsubstituted pyrrolyl; a substituted or unsubstituted imidazolyl; a substituted or unsubstituted pyrazolyl; a substituted or unsubstituted pyridinyl; a substituted or unsubstituted pyrazinyl; a substituted or unsubstituted pyrimidinyl; a substituted or unsubstituted pyridazinyl; a substituted or unsubstituted oxazolyl; a substituted or unsubstituted thiazolyl; a substituted or unsubstituted isothiazolyl; a substituted or unsubstituted pyrrolidonyl; a substituted or unsubstituted morpholinyl; a substituted or unsubstituted oxazolidinonyl; or a substituted or unsubstituted caprolactamyl.

9. The pretreatment method for analyzing dioxin compounds of claim 1,
wherein the polymer beads each are a copolymer including one kind of the hydrophobic repeating unit derived from the vinyl aromatic monomer having the non-polar functional group and one kind of the hydrophilic repeating unit derived from the vinyl aromatic monomer having the polar functional group; a terpolymer including two kinds of the hydrophobic repeating units derived from the vinyl aromatic monomer having the non-polar functional group and one kind of the hydrophilic repeating unit derived from the vinyl aromatic monomer having the polar functional group; or a terpolymer including one kind of the hydrophobic repeating unit derived from the vinyl aromatic monomer having the non-polar functional group and two kinds of the hydrophilic repeating units derived from the vinyl aromatic monomer having the polar functional group.

10. The pretreatment method for analyzing dioxin compounds of claim 1,
wherein the polymer beads are each one or more selected from the group consisting of a polystyrene-polyvinylphenol copolymer, a polystyrene-polyvinylphenylmethanol copolymer, a polydivinylbenzene-polyvinylphenol copolymer, a polydivinylbenzene-polyvinylphenylmethanol copolymer, a polystyrene-polydivinylbenzene-polyvinylphenol terpolymer, and a polystyrene-polydivinylbenzene-polyvinylphenylmethanol terpolymer.

11. The pretreatment method for analyzing dioxin compounds of claim 1,
wherein the polymer beads have an average particle size of 10 μm to 100 μm.

12. The pretreatment method for analyzing dioxin compounds of claim 1,
wherein the first solvent is one or more selected from the group consisting of methanol, ethanol, n-propanol, isopropanol, n-butanol, ethyl acetate, tetrahydrofuran (THF), dichloromethane, acetone, and acetonitrile.

13. The pretreatment method for analyzing dioxin compounds of claim 1,
wherein the second solvent is one or more selected from the group consisting of toluene, hexane, benzene, diethyl ether, and chloroform.

14. The pretreatment method for analyzing dioxin compounds of claim 1, further comprising, between the steps 1) and 2), the steps of:

adding an internal standard for purification to the liquid extract; and concentrating the liquid extract to which the internal standard for purification is added.

15. The pretreatment method for analyzing dioxin compounds of claim 1, further comprising, after the step 4), the steps of:

concentrating the eluate; and adding an internal standard for syringe addition to the concentrated eluate.

16. An analytical method for dioxin compounds, the method comprising the step of performing instrumental analysis of a sample which is pretreated by the pretreatment method of claim 1.

17. The analytical method for dioxin compounds of claim 16, wherein the instrumental analysis is performed by gas chromatography/high-resolution mass spectrometry.

* * * * *